Patented Oct. 6, 1936

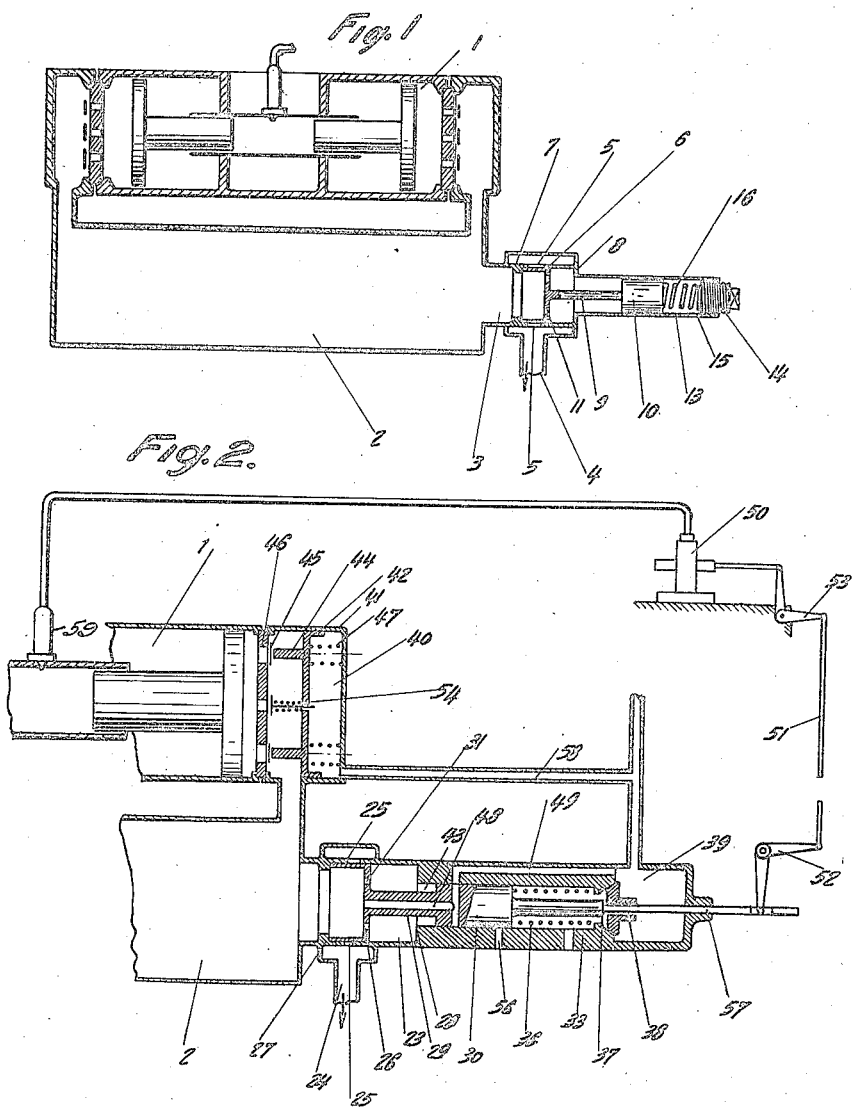

2,056,533

UNITED STATES PATENT OFFICE 2,056,533

FREE PISTON COMPRESSOR

Raul Pateras Pescara, Paris, France

Application October 5, 1932, Serial No. 636,370
In France October 6, 1931

12 Claims. (Cl. 230—56)

The present invention relates to improvements in internal combustion air compressors with freely moving pistons and is particularly concerned with a new automatic safety arrangement applicable to these motor compressors. It also relates to the application of the same arrangement for the separate or the combined control of other special elements such as the piston for blocking the outlet valves at starting, the system for regulating the injection pump and the safety system for limiting the maximum pressure in the high pressure reservoir, which members, as well as their operation, are already known.

The invention has for its object to maintain the pressure in the compressed air reservoir above a limit which is judged to be indispensable for the return of the compressor pistons. It has for its object also the simplification of the auxiliary members and of their control.

The invention consists essentially:

1. In interposing between the compressed air reservoir and the outlet of said reservoir a closure member controlled automatically by the pressure itself of the air in this reservoir.

2. In combining this closure member with the mechanism for controlling the discharge of the compressed air behind the piston which blocks the outlet valves upon their seats at starting.

3. In combining the said closure member with the injection pump and utilizing its movement as a function of the pressure for controlling the feed of the compressor.

4. In combining the said closure member with a safety arrangement for limiting the maximum pressure in the high pressure reservoir.

5. In combining the said closure member with a structure for controlling the discharge of the compressed air behind the piston, for the control of the injection pump and for the control of the maximum pressure.

The invention will be well understood with the aid of the following and of the attached drawing, which represents only by way of example one of the possible embodiments of the invention.

Fig. 1 shows a longitudinal section of the closure member itself mounted on the air supply reservoir of a motor compressor with free pistons.

Fig. 2 represents partially in section and partially in elevation an application of the same member for the combined control of a blocking piston for the outlet valves at starting and for the control of the regulator and the safety valve.

According to Fig. 1, the air compressed by the motor compressor 1 and stored in the air supply reservoir 2 passes out normally through the cylindrical conduit 3 and by the conduit 4. The two conduits 3 and 4 are put into communication by the apertures or orifices 5 which can be closed by a piston valve 6, the end of which carries the orifices 11. The piston 6 is adapted to be displaced in the cylinder 3 between two abutments 7, 8. The rod 9 of the piston valve 6 is terminated by a piston 10 which can slide in a cylinder 13 receiving on its front face the air pressure of the reservoir 2 and on the rear face the pressure of a spring 16, the tension of which is adjustable by an abutment or plug 14 screwed into the cylinder 13. A hole 15 pierced at the extremity of the cylinder 13 places the rear face of the piston 10 in communication with the atmosphere.

It will be seen that when the pressure of air in the high pressure reservoir 2 overcomes the action of the spring 16 on the piston 10, the piston valve 6 by displacement opens the orifices 5, placing the conduits 3 and 4 in communication. On the contrary, if the pressure in the reservoir 2 falls below the admissible limit, the piston valve 6 being actuated by the spring 16, closes the apertures 5.

According to Fig. 2, the valve means comprises a piston valve 26, able to slide in the cylinder 23 between two abutments 27 and 28, which closes or opens the apertures 25 by its longitudinal displacement, placing in communication conduits 23 and 24. The rod 29 of the piston 26 carries a shoulder forming a further piston 30 and beyond that a rod forming an abutment 37 which by its displacement towards the right, opens a discharge valve 38. This same portion is terminated by a further rod of smaller diameter 57 adapted to slide in the valve 38. The rod 57 at its free extremity controls the feed of the injection pump 50 by a bell crank and the levers 52, 51, 53. The piston 30 subjected on its front face to the action of the compressed air in the reservoir by reason of the holes 31 cut in the base of the piston 26 and subjected on its rear face to the action of an opposing spring 36 which can be displaced longitudinally in a cylinder 33 according to the direction of the resultant of these two forces. The rear face of the piston 30 is always in communication with the atmosphere and can be placed in communication with the space 39 by the opening of the valve 38 which space itself communicates by the tube 58 with the space 40 constituted by a controlling cylinder 41 in which can slide a controlling piston 42 carrying the abutments 44 which upon their displacement towards the left, press the outlet valves such as 45 on to their seats 46. The springs 47 have always a tendency to block the valves 45 upon their seats 46. The piston 30 upon movement to the left can place the spaces 39 and 40 in communication with the high pressure reservoir 2 by means of the passages 48 and 49. A small relief valve 54 permits a small quantity of air from the compressor to pass to the reservoir 2 when the valves 45 are blocked on their seats. The passage 48 can also place the reservoir 2 in communication with the atmosphere by means of the port 56.

The operation is as follows:

At starting, the reservoir 2 not being under pressure, the springs 47 block the outlet valves 45 upon their seats 46. At every compression stroke there only passes a small quantity of air through the valve 54 and there thus remains sufficient energy in the compressor spaces for effecting the return of the pistons. The pressure in the reservoir 2 being present on both faces of the piston 42 communicating with one another by the passages 48 and 49, increases at every stroke of the compressor for the piston valve 26 closes the apertures 25. When the pressure on the front face of the piston 30 overcomes the action of the opposing spring 36, the assembly 26, 30, 37, 57 is displaced towards the right, closing the passage 49 and opening the discharge valve 38. The pressure on the rear of the piston 42 being released by the opening of the valve 38 and the piston being subjected to the pressure of the reservoir on its front face, is displaced towards the right, thus liberating the outlet valves 45 so that the compressor can then feed all the air directly into the reservoir 2. The pressure in this latter continues to increase and the piston valve 26 then uncovers the apertures 25, permitting the feed of air from the reservoir 2 into the outlet conduit 24.

It is advantageous during the period of starting or while the apparatus is cold, to leave the outlet valves blocked until the pressure in the reservoir 2 exceeds considerably the minimum pressure. This result is obtained automatically if the valve 38 is sufficiently large so that the spring 36 is assisted by a pressure corresponding to the minimum pressure of the reservoir on the piston 30. The discharge valve 38 will only open when the pressure in the reservoir is substantially greater than the minimum pressure by reason of the fact that to the action of the spring 36 there is added the action of the pressure in the reservoir on the rear face of the valve 38. This latter action, however, is suppressed as soon as the valve 38 is raised since at this moment the spaces 39 and 40 are discharged and the passage 48 is closed in such a way that the displacement towards the left of the assembly 26, 30, 37, 57 producing the closure of the apertures 25 is effected only under the action of the spring 36.

The injection pump 50 with adjustable feed and of known operation is controlled by the piston 30 which is connected to the pump 50 by a set of levers 51, 52, 53. The displacement of the piston 30 under the influence of increasing pressure in the reservoir 2 actuates the feed control of the pump 50 and reduces the quantity of fuel injected by injector 59 when the pressure in the reservoir exceeds the normal pressure until it has been reduced to the feed necessary for maintaining the operation of the compressor without increasing the pressure in the reservoir.

If in the course of operation the pressure in the reservoir 2 exceeds an admissible upper limit, the extreme displacement to the right of the piston 26 placing in communication the channels 48 and 56, allows the compressed air to escape into the atmosphere according to the known principle of safety.

It is obvious that the arrangement forming the subject of the present invention described in the most complete form for controlling separately the members of one or two of the three known systems indicated above, can control one alone by simply omitting the members serving to control the two others.

What I claim and desire to secure by Letters Patent of the United States of America is:—

1. In an internal combustion air compressor with freely moving pistons, an air reservoir, an outlet conduit from said reservoir, a valve controlling the communication between said outlet conduit and said reservoir, said valve being controlled by the pressure in said reservoir, a spring acting on said valve against said pressure in said reservoir, piston means for blocking the outlet valves of the compressor during starting, said first mentioned valve having associated therewith portways whereby on increase of pressure in the reservoir to a predetermined value, said blocking means is rendered inoperative, and a relief valve to permit air to pass to both sides of said blocking piston during the period at which this piston is operative to block the outlet valves.

2. In an internal combustion air compressor with freely moving pistons as claimed in claim 1, means whereby the movement of the valve actuated by the pressure in the reservoir controls the working of the fuel pump.

3. In an internal combustion air compressor with freely moving pistons according to claim 1, a number of jointed links between the valve controlled by the pressure in the reservoir and the injection pump, whereby the functioning of the latter may be controlled.

4. In an internal combustion air compressor with freely moving pistons according to claim 1, means associated with the valve controlled by the pressure in the reservoir, whereby when this pressure exceeds a predetermined amount, a relief valve is opened.

5. An internal combustion air compressor with freely moving pistons comprising an air reservoir, one or more compressor cylinders, outlet valves associated with said cylinders, means to press each of said outlet valves against its seat; during the starting phase, said means including a valve operating piston movable in a cylinder, and a spring co-operating with said piston, a small relief valve adapted to open when the outlet valves are held on their seats by the said means, an outlet conduit associated with said reservoir, an axially slidable valve actuated in one direction by the air pressure in the reservoir, a spring acting on said valve in the other direction, said valve having portways associated therewith to control the passage of air from said reservoir to said outlet conduit, a piston valve at the rear of the said axially slidable valve, said piston valve having passages cut therein permitting communication between both sides of said valve operating piston, a relief valve to permit communication between the rear side of said valve operating piston and the atmosphere on displacement of said axially moving valve system, whereby said piston is retracted by virtue of the pressure existing in the reservoir, to permit the outlet valves to function in the normal manner, and means associated with said axially moving valve to control the functioning of the fuel pump.

6. An internal combustion air compressor having at least one freely moving piston comprising, in combination, an air reservoir, at least one compressor cylinder, at least one outlet valve associated with said cylinder, means to hold said outlet valve closed during the starting period, said means including a controlling cylinder, a spring and a controlling piston movable in said controlling cylinder, said cylinder having an opening on one side of said controlling piston communicating with said reservoir, a relief valve associated with said cylinder and adapted to open when the outlet valve is held closed, a passageway between the opposite side of said controlling piston and said reservoir, valve-means adapted to connect the opposite side of said controlling piston during the starting period with the reservoir and after the starting period with the atmosphere, said valve means being actuated in one direction by the air pressure in the reservoir, a spring acting on said valve means in the other direction, and a movable member adapted to aid said last named spring during the starting period, one side of said movable member being under the pressure of the atmosphere and the other side being under the pressure working on the opposite side of said controlling piston.

7. An internal combustion air compressor having at least one freely moving piston comprising, in combination, an air reservoir, at least one compressor cylinder, at least one outlet valve associated with said cylinder, means to hold said outlet valve closed during the starting period, said means including a controlling cylinder, a spring and a controlling piston movable in said controlling cylinder, said cylinder having an opening on one side of said controlling piston communicating with said reservoir, a relief valve associated with said cylinder and adapted to open when the outlet valve is held closed, a passageway between the opposite side of said controlling piston and said reservoir, valve means adapted to connect the opposite side of said controlling piston during the starting period with the reservoir and after the starting period with the atmosphere, said valve means being actuated in one direction by the air pressure in the reservoir, a spring acting on said valve means in the other direction by a force corresponding to the minimum working pressure of the reservoir, and a movable member, adapted to aid said last named spring during the starting period, one side of said movable member being under the pressure of the atmosphere and the other side being under the pressure working on the opposite side of said controlling piston.

8. An internal combustion air compressor having at least one freely moving piston comprising, in combination, an air reservoir, at least one compressor cylinder, at least one outlet valve associated with said cylinder, means to hold said outlet valve closed during the starting period, said means including a controlling cylinder, a spring and a controlling piston movable in said controlling cylinder, said cylinder having an opening on one side of said controlling piston communicating with said reservoir, a relief valve associated with said cylinder and adapted to open when the outlet valve is held closed, valve means permitting communication between the opposite side of said controlling piston and the reservoir and actuated in one direction by the air pressure in the reservoir, a spring acting on said valve means in the other direction, a movable member cooperating with said valve means to aid the action of said latter spring, one side of said member being under the pressure of the atmosphere and the other side being under the pressure working on the opposite side of said controlling piston, said member also comprising a relief valve to permit communication between the opposite side of said controlling piston and the atmosphere on displacement by said valve means, whereby said controlling piston is retracted by virtue of the pressure existing in the reservoir to permit the outlet valve to function in the normal manner.

9. An internal combustion air compressor having at least one freely moving piston comprising, in combination, an air reservoir, at least one compressor cylinder, at least one outlet valve associated with said cylinder, means to hold said outlet valve closed during the starting period, said means including a controlling cylinder, a spring and a controlling piston movable in said controlling cylinder, said cylinder having an opening on one side of said controlling piston communicating with said reservoir, a relief valve associated with said cylinder and adapted to open when the outlet valve is held closed, a passageway between the opposite side of said controlling piston and said reservoir, valve means adapted to connect the opposite side of said controlling piston during the starting period with the reservoir and after the starting period with the atmosphere, said valve means being actuated in one direction by the air pressure in the reservoir, a spring acting on said valve means in the other direction, and a movable abutment member adapted to aid the latter spring during the starting period, one side of said abutment member being under the pressure of the atmosphere and the other side being under the pressure working on the opposite side of said controlling piston, the latter pressure holding said abutment member during the starting period in its spring aiding position.

10. An internal combustion air compressor having at least one freely moving piston comprising in combination, an air reservoir, at least one compressor cylinder, at least one outlet valve associated with said cylinder, means to hold said outlet valve closed during the starting period, said means including a controlling cylinder, a spring and a controlling piston movable in said controlling cylinder, said cylinder having an opening on one side of said controlling piston communicating with said reservoir, a relief valve associated with said cylinder and adapted to open when the outlet valve is held closed, an outlet conduit associated with said reservoir, an axially slidable valve actuated in one direction by the air pressure in the reservoir, a spring acting on said valve in the other direction, said valve having portways associated therewith to control the passage of air from said reservoir to said outlet conduit, a piston valve at the rear of the said axially slidable valve, said piston valve having passages cut therein permitting communication between said reservoir and the opposite side of said controlling piston, a relief valve to permit communication between the opposite side of said controlling piston and the atmosphere on displacement of said axially moving valve, said valve-portways being so disposed that the said displacement opens first the relief valve and then said portways.

11. An internal combustion air compressor with freely moving pistons comprising, an air reservoir, at least one compressor cylinder, outlet valves associated with said cylinder, means to press each of said outlet valves against its seats during the starting phase, said means including a controlling cylinder, a controlling piston movable in said controlling cylinder and a spring cooperating with said piston, a small relief valve adapted to open when the outlet valves are held on their seats by the said means, an outlet conduit associated with said reservoir, an axially slidable valve actuated in one direction by the air pressure in the reservoir, a spring acting on said valve in the other direction, said valve having portways associated therewith to control the passage of air from said reservoir to said outlet conduit, a piston valve at the rear of said axially slidable valve, said piston valve having passages cut therein permitting communication between both sides of said further piston, and a relief valve to permit communication between the rear side of said controlling piston and the atmosphere upon displacement of said axially moving valve, whereby said piston is retracted by virtue of the pressure existing in the reservoir, to permit the outlet valves to function in the normal manner.

12. An internal combustion air compressor having at least one freely moving piston comprising in combination at least one compressor cylinder, at least one outlet valve associated with said cylinder, an air reservoir communicating with said outlet valve, an outlet conduit associated with said reservoir, a valve controlling the communication between said outlet conduit and said reservoir in accordance with the pressure existing in said reservoir, a fuel pump for said compressor, and means movable with said valve for controlling the amount of fuel issuing from said fuel pump.

RAUL PATERAS PESCARA.